(12) United States Patent
Egging et al.

(10) Patent No.: US 9,769,987 B2
(45) Date of Patent: Sep. 26, 2017

(54) BALE PROCESSOR

(71) Applicant: VERMEER MANUFACTURING COMPANY, Pella, IA (US)

(72) Inventors: Phil Egging, Reasnor, IA (US); Phil Stam, Pella, IA (US); Lucas Graham, New Sharon, IA (US); Tyler Schiferl, Pella, IA (US); Luke Mushitz, Yankton, SD (US)

(73) Assignee: Vermeer Manufacturing Company, Pella, IA (US)

( * ) Notice: Subject to any disclaimer, the term of this patent is extended or adjusted under 35 U.S.C. 154(b) by 641 days.

(21) Appl. No.: 14/290,558

(22) Filed: May 29, 2014

(65) Prior Publication Data
US 2015/0342122 A1   Dec. 3, 2015

(51) Int. Cl.
*A01F 29/00* (2006.01)
*A01F 29/10* (2006.01)
*A01D 87/00* (2006.01)

(52) U.S. Cl.
CPC ........ *A01F 29/005* (2013.01); *A01D 87/0007* (2013.01); *A01F 29/10* (2013.01)

(58) Field of Classification Search
CPC ........ A01F 29/10; A01F 29/12; A01F 29/005; A01F 29/02; A01D 87/0007
USPC .......................... 241/605, 101.76, 280, 186.4
See application file for complete search history.

(56) References Cited

U.S. PATENT DOCUMENTS

| | | | |
|---|---|---|---|
| 9,114 A | 7/1852 | Gilbert | |
| 1,787,526 A | 1/1931 | Honstain | |
| 2,752,160 A | 6/1956 | Fahrner | |
| 2,753,908 A | 7/1956 | Anderson | |
| 3,208,491 A * | 9/1965 | Bliss | A01F 29/005 241/186.35 |

(Continued)

FOREIGN PATENT DOCUMENTS

| | | |
|---|---|---|
| JP | 2002-346409 | 12/2002 |
| WO | WO2004/075632 | 9/2004 |

(Continued)

OTHER PUBLICATIONS

PCT/US2014/054113, International Search Report & Written Opinion mailed Feb. 17, 2015, 13 pages.

(Continued)

*Primary Examiner* — Faye Francis
(74) *Attorney, Agent, or Firm* — Lathrop Gage LLP

(57) ABSTRACT

In one embodiment, a bale processor includes a hopper for receiving a bale of baled material, a discharge opening for outputting chopped material, and a processing section below the hopper and intersecting the hopper at an impingement zone. The processing section has primary and secondary rotors. The primary rotor is rotatable and has flails sufficiently long to extend into the impingement zone to chop the material from the bale received in the hopper when the primary rotor is rotated. The secondary rotor is rotatable and has flails to chop the material after being chopped by the primary rotor. The secondary rotor is offset from the primary rotor such that the secondary rotor is on one side of the primary rotor, the discharge opening is on another side of the primary rotor, and the only passage from the secondary rotor to the discharge opening crosses the primary rotor.

20 Claims, 7 Drawing Sheets

(56) References Cited

U.S. PATENT DOCUMENTS

| | | | |
|---|---|---|---|
| 3,589,627 A * | 6/1971 | Torrence | B02C 13/06 |
| | | | 241/106 |
| 3,863,850 A * | 2/1975 | Freeman | A01D 90/10 |
| | | | 241/101.762 |
| 3,915,392 A * | 10/1975 | Kugler | A01F 29/005 |
| | | | 241/223 |
| 4,779,810 A | 10/1988 | Frey | |
| 5,042,973 A | 8/1991 | Hammarstrand | |
| 5,232,405 A | 8/1993 | Redekop | |
| 5,272,861 A | 12/1993 | Roynberg | |
| 5,447,276 A * | 9/1995 | Aldridge | D01B 1/14 |
| | | | 241/159 |
| 5,482,508 A | 1/1996 | Redekop et al. | |
| 5,597,125 A * | 1/1997 | Bouldin | A01F 29/005 |
| | | | 241/136 |
| 6,109,553 A * | 8/2000 | Hruska | A01F 29/005 |
| | | | 241/189.1 |
| 6,409,110 B1 * | 6/2002 | Piper | A01F 29/005 |
| | | | 241/230 |
| 6,478,674 B2 | 11/2002 | Redekop | |
| 6,692,351 B2 | 2/2004 | Johnson et al. | |
| 6,699,121 B2 | 3/2004 | Bognar et al. | |
| 7,546,966 B2 * | 6/2009 | Lepage | A01F 29/005 |
| | | | 241/285.2 |
| 7,621,477 B2 | 11/2009 | Young | |
| 7,757,980 B2 * | 7/2010 | Oare | A01F 29/005 |
| | | | 241/101.76 |
| 8,221,203 B1 | 7/2012 | Flickinger et al. | |
| 8,231,072 B2 | 7/2012 | Willibald | |
| 8,800,903 B1 | 8/2014 | Young | |
| 2002/0169011 A1 | 11/2002 | Wilson | |
| 2007/0023554 A1 | 2/2007 | Young | |
| 2009/0321546 A1 | 12/2009 | Plumb et al. | |
| 2011/0042498 A1 | 2/2011 | Young et al. | |

FOREIGN PATENT DOCUMENTS

| | | |
|---|---|---|
| WO | WO2013/066287 | 5/2013 |
| WO | WO2013/112841 | 8/2013 |

OTHER PUBLICATIONS

U.S. Appl. No. 14/616,489 Non-Final Office Action dated Jan. 18, 2017, 13 pages.

* cited by examiner

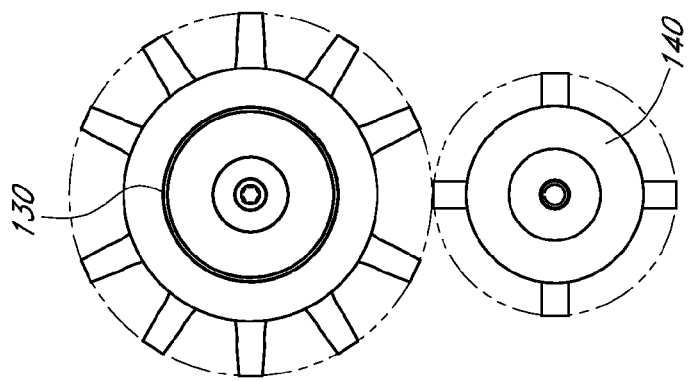
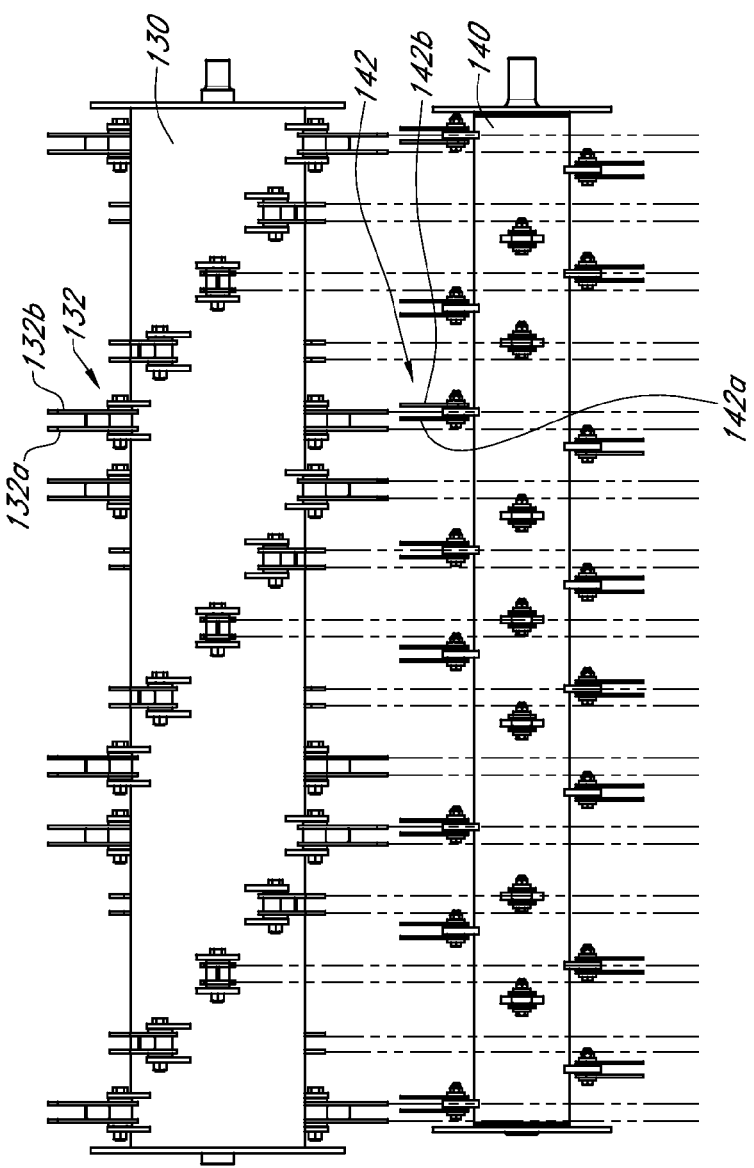
FIG. 6B
FIG. 6A

BALE PROCESSOR

BACKGROUND

The current invention relates generally to bale processors. Bale processors are devices used to spread the content of bales of bale filamentary material in a controlled way for reasons such as mulching or feeding livestock. Examples of bale processors are shown in PCT/US2013/023153 filed by Vermeer Manufacturing Company, published as WO2013/112841; and PCT/US2011/058514 filed by Vermeer Manufacturing Company, published as WO2013/066287. Both of those publications are incorporated herein by reference in their entirety—and form part of—the current disclosure.

In general, prior art bale processors have limited abilities to output chopped material at different selected lengths.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a bale processor includes a hopper for receiving baled material, a discharge opening for outputting chopped material, and a processing section. The processing section has primary and secondary rotors. The primary rotor has an axis of rotation and is rotatable to chop the baled material from the hopper. The secondary rotor is rotatable to chop the material after being chopped by the primary rotor, and the secondary rotor is offset from the primary rotor such that the primary rotor is between the secondary rotor and the discharge opening.

According to another embodiment, a bale processor includes a hopper for receiving baled material, a discharge opening for outputting chopped material, and a processing section below the hopper and intersecting the hopper at an impingement zone. The processing section has primary and secondary rotors. The primary rotor is rotatable and has flails sufficiently long to extend into the impingement zone to chop the material from the hopper when the primary rotor is rotated. The secondary rotor is rotatable and has flails to chop the material after being chopped by the primary rotor. The secondary rotor is offset from the primary rotor such that the secondary rotor is on one side of the primary rotor, the discharge opening is on another side of the primary rotor, and the only passage from the secondary rotor to the discharge opening crosses the primary rotor.

According to still another embodiment, a method of processing baled material includes providing a bale processor having a hopper for receiving baled material, a discharge opening for outputting chopped material, a primary rotor that is rotatable and has an axis of rotation, a secondary rotor that is rotatable and has an axis of rotation generally parallel to the primary rotor axis of rotation, a disengagement mechanism in communication with the secondary rotor for altering the secondary rotor between engaged and disengaged configurations, and a movable internal deflector. The secondary rotor is offset from the primary rotor such that the primary rotor is between the secondary rotor and the discharge opening. The method further includes: using the disengagement mechanism to alter the secondary rotor between the engaged and disengaged configurations; moving the internal deflector to allow generally unobstructed passage between the primary rotor and the secondary rotor when the secondary rotor is in the engaged configuration, and to shield the secondary rotor from the primary rotor when the secondary rotor is in the disengaged configuration; providing baled material in the hopper; and rotating the primary rotor in a first direction to chop the baled material from the hopper such that the material chopped by the primary rotor temporarily travels away from the discharge opening. When the secondary rotor is in the engaged configuration, the secondary rotor is rotated in the same direction as the primary rotor such that the secondary rotor rotates material away from and subsequently back toward the primary rotor; rotation of the primary rotor and the secondary rotor results in three distinct chopping phases: first, chopping by the primary rotor; second, chopping by the secondary rotor; and third, additional chopping by the primary rotor. When the secondary rotor is in the disengaged configuration, the material chopped by the primary rotor is passed to the discharge opening without encountering the secondary rotor.

BRIEF DESCRIPTION OF THE DRAWINGS

FIG. 5b is a side view of FIG. 5a.

FIG. 6a shows primary and secondary non-intermeshing rotors according to another embodiment of the current invention.

FIG. 6b is a side view of FIG. 6a.

DETAILED DESCRIPTION

Figure 1:
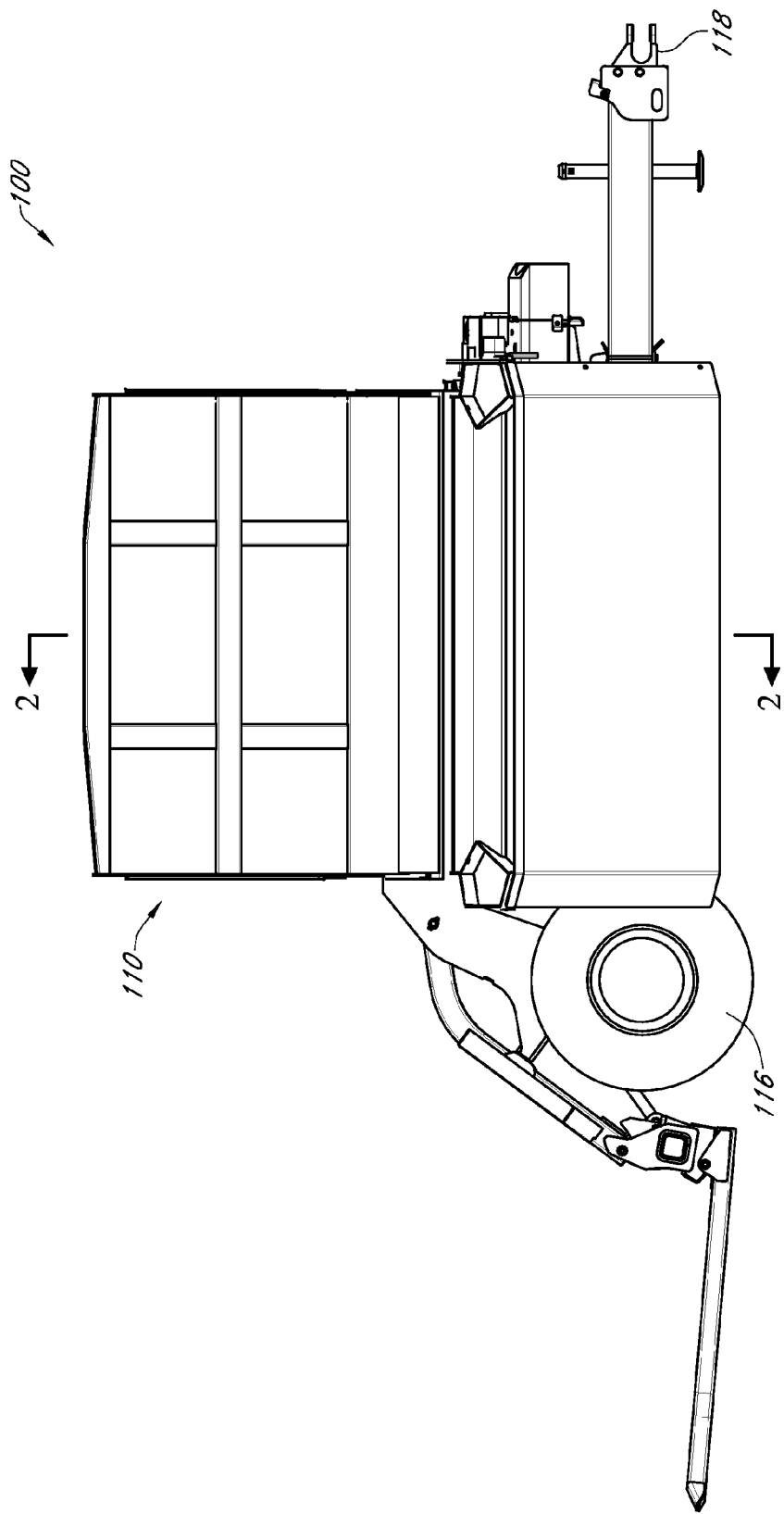
FIG. 1 shows a bale processor according to one embodiment of the current invention.
Figure 2:
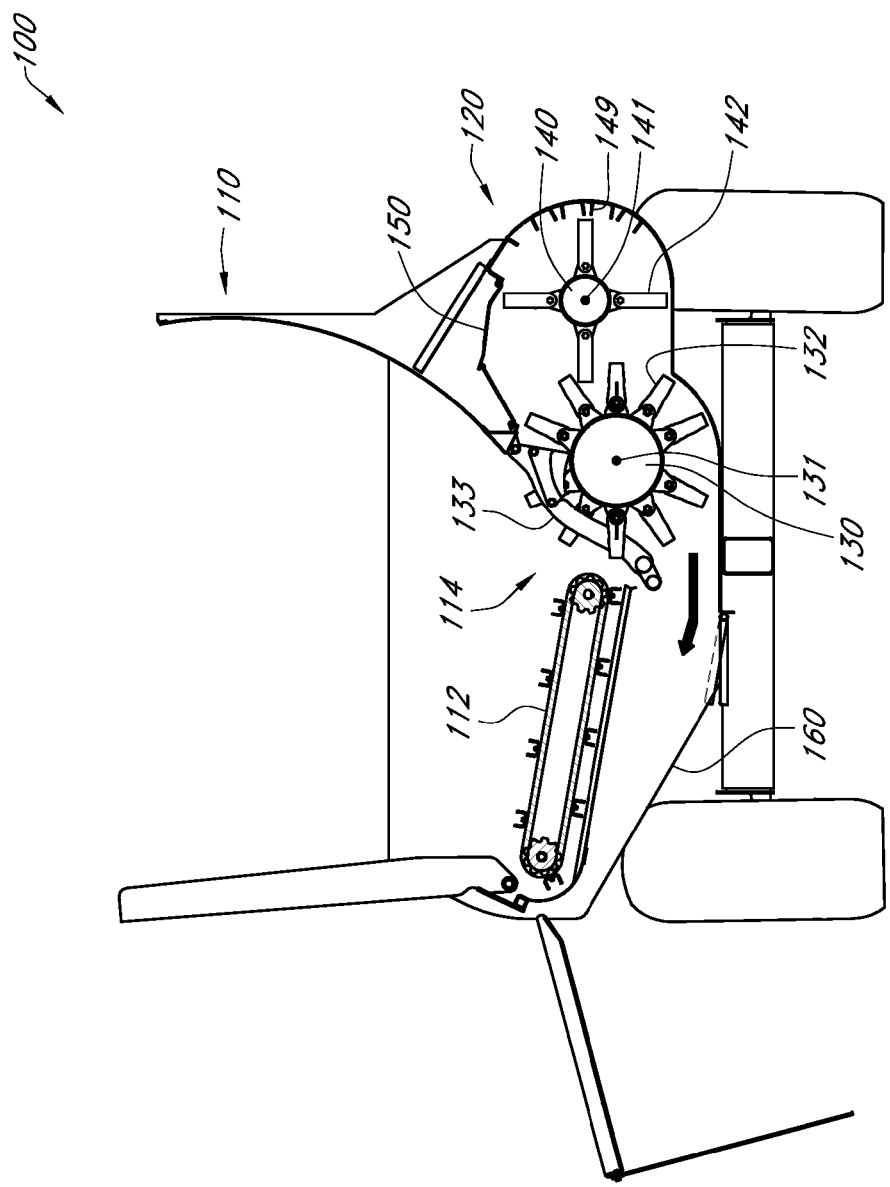
FIG. 2 is a section view taken at line B-B of FIG. 1, with a secondary rotor engaged.
Figure 3:
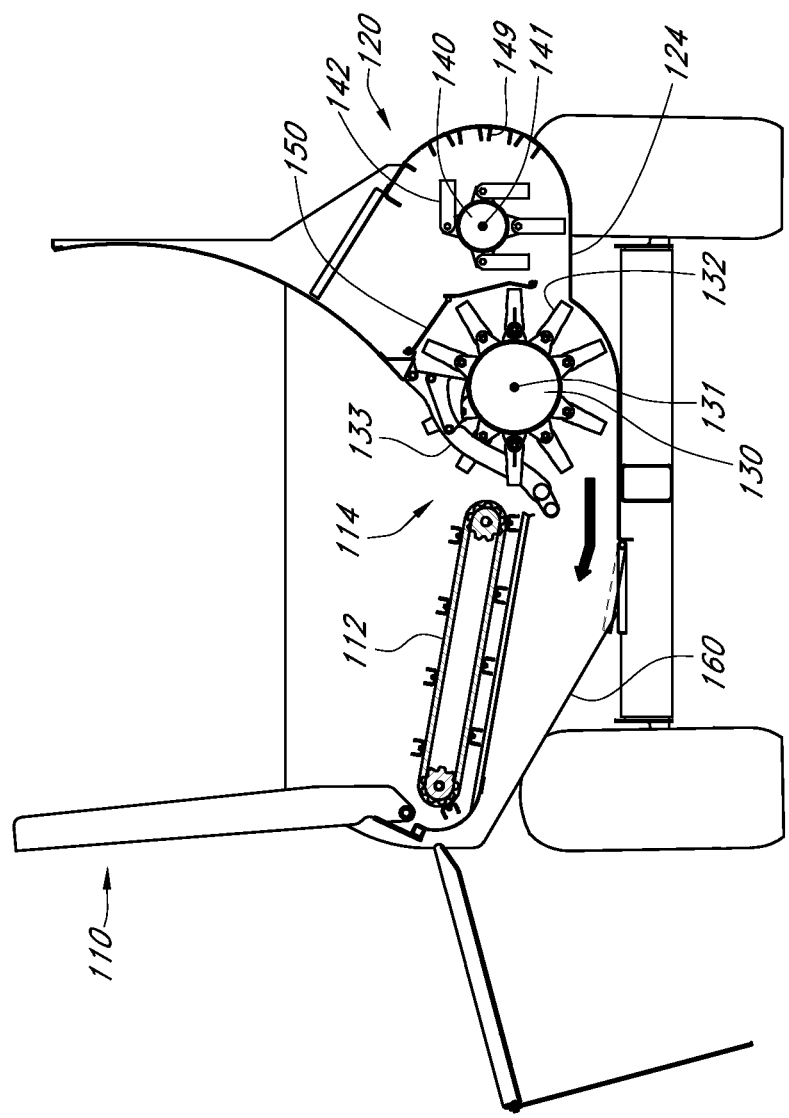
FIG. 3 is a section view taken at line B-B of FIG. 1, with the secondary rotor disengaged.

FIGS. 1 through 3 illustrate a bale processor 100, according to one embodiment. The bale processor 100 includes a hopper (or "tub") 110 for receiving bale of forage, bedding, or another bale filamentary material (e.g., hay, straw, corn stover, etc.); a processing section 120 that includes primary and secondary rotors 130, 140; and a discharge opening 160 for outputting processed (or "chopped") bale filamentary material. The terms "primary" and "secondary" are used herein for convenience in referring to the rotors 130, 140 and indicate that the bale filamentary material interacts with the rotor 130 before interacting with the rotor 140 (as described in detail below).

The hopper 110 of embodiment 100 is consistent with "hopper 12" of WO2013/066287. However, as will be appreciated by those skilled in the art, the hopper 110 may be of various configurations, shapes, and sizes. A conveyor 112, as shown in FIGS. 2 and 3, may be included in the hopper 110 to rotate a bale inside the hopper 110. The conveyor 112 of embodiment 100 and its means of operation are consistent with "chain conveyor 16" and the accompanying disclosure in WO2013/066287. But especially since various conveyors are well known, those skilled in the art will understand that alternate types of conveyors and ways of powering conveyors—whether now known or later developed—may be utilized. Further, "conveyor" is used broadly herein to include any various elements (e.g., rotatable wheels and cams) capable of rotating bales inside the hopper 110.

As shown in the drawings, the bale processor 100 may include elements for allowing travel and transport thereof— e.g., wheels 116 and hitch 118. Mobility may not be desirable in all cases, however, and stationary embodiments are clearly contemplated herein.

Attention is now directed to the processing section 120 (FIGS. 2 and 3). The primary rotor 130 is positioned to interact with (i.e., chop) the bale in the hopper 110, preferably—though not necessarily—as the bale rotates due to the conveyor 112. Directions of the primary rotor 130 and the conveyor 112 can each change as desired, but the default direction of both when looking at FIGS. 2 and 3 is clockwise.

The primary rotor 130 may have various cutting configurations for cutting bale filamentary material, whether now known or later developed. In embodiment 100, the primary rotor 130 is consistent with "flail rotor 14" of WO2013/066287. Moreover, at least one control/slug bar 133 consistent with the "depth control bars/slugs 18" of WO2013/066287 is included in embodiment 100 for controlling the distance that an outer end of the rotor 130 extends into an outer surface of a bale in the hopper 110.

Clockwise rotation (in FIGS. 2 and 3) of the primary rotor 130 chops bale filamentary material from a bale in the hopper 110 in an impingement zone 114—as described regarding operation of the "flail rotor 14" in WO2013/066287. But instead of the chopped bale filamentary material always directly exiting the bale processor through a discharge opening once chopped, bale filamentary material in the bale processor 100 may advance in a direction away from the discharge opening 160 to the secondary rotor 140.

The secondary rotor 140 is laterally offset from the primary rotor 130, and it may be desirable for an axis 141 of the secondary rotor 140 to be generally parallel to and higher than an axis 131 of the primary rotor 130 (FIG. 2). Moreover, it may be desirable for the processing section 120 to have a wall 124 extending generally horizontally at least from a point below the axis 141 to a point past extended flails 132 of the primary rotor 140, as shown in FIG. 3.

Figure 5B:
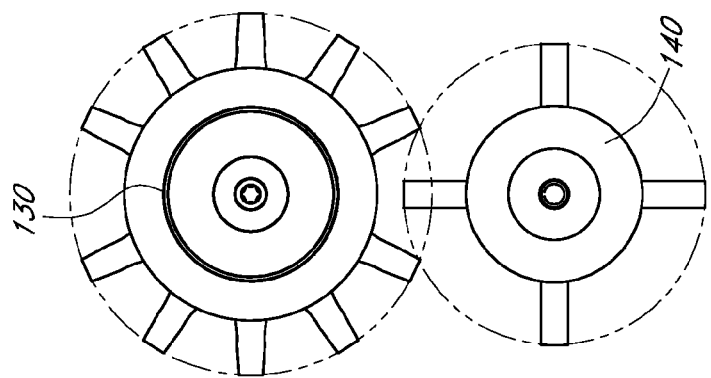
Figure 5A:
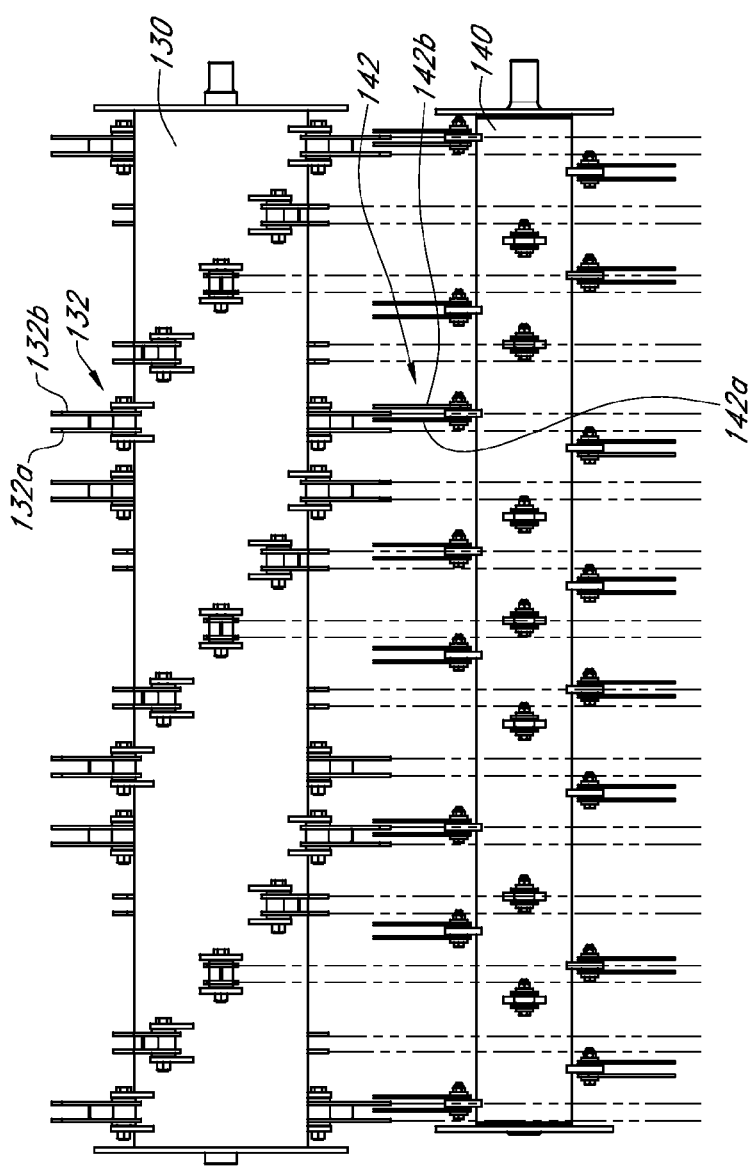
FIG. 5a shows primary and secondary intermeshing rotors according to an embodiment of the current invention.

As with the primary rotor 130, the secondary rotor 140 may be configured in various ways to cut bale filamentary material. In some embodiments, the secondary rotor 140 intermeshes with the primary rotor 130 when in use; in other embodiments, the rotors 130, 140 are non-intermeshing. An example intermeshing arrangement is shown in FIGS. 5a and 5b, and an example non-intermeshing arrangement is shown in FIGS. 6a and 6b. Intermeshing may increase the transfer of bale filamentary material between the rotors 130, 140.

In both FIG. 5a and FIG. 6a, flails 132 have a one-piece design with two blades 132a, 132b. Flails 142 are similarly shown having two blades 142a, 142b; and while FIGS. 5a and 6a do not show blades 142a, 142b in a one-piece design (instead, the blades 142a, 142b are individual, free swinging blades mounted on either side of a common pivot, such as by a common bolt), a one-piece design may nevertheless be used. While two blades are not required in all embodiments, they may provide increased mass and stability over a single blade, and may lose less energy (and therefore put more energy into a cutting action) than a single blade. Further, a two-blade intermeshing arrangement may provide still improved transfer of bale filamentary material between the rotors 130, 140. For example, the intermeshing arrangement may reduce the distance that bale filamentary material must travel unassisted, greatly reducing the probability of wet material sticking or stopping forward travel (causing a plugged condition).

Rasp bars 149 may be adjacent the secondary rotor 140 to agitate material rotated by the secondary rotor 140, increasing the chopping effectiveness of the secondary rotor 140. Additionally, or alternately, rasp bars may be formed with or coupled to the secondary rotor 140 (such as protrusions from a twelve o'clock position to a six o'clock position along the secondary rotor 140, for example) to keep the bale filamentary material agitated and thus chopped multiple times.

Gearing or other power-transmitting devices 205 (e.g., belts and pulleys, chains and sprockets, etc.) may allow a single motor 200 to power both the primary rotor 130 and the secondary rotor 140 (and further the conveyor 112), though multiple motors or other rotation-inducing devices may be used. Further, while the secondary rotor 140 may rotate opposite the primary rotor 130, it may be desirable for both to rotate in the same direction (e.g., clockwise in FIG. 2). In the embodiment 100, the secondary rotor 140 is smaller than the primary rotor 130 and rotates at a higher RPM. It may be desirable for the secondary rotor 140 to rotate at least fifty percent faster than the primary rotor 130, even more desirable for the secondary rotor 140 to rotate at least eighty-five percent faster than the primary rotor 130, and even still more desirable for the secondary rotor 140 to rotate at least twice as fast as the primary rotor 130. For example, the primary rotor 130 may rotate at approximately 1500 RPM and the secondary rotor 140 may rotate at approximately 3000 RPM. In commercial embodiments of the bale processor in WO2013/066287, rotation of the "flail rotor 14" may be at approximately 1000 RPM to achieve similar throw distances.

Figure 7A:
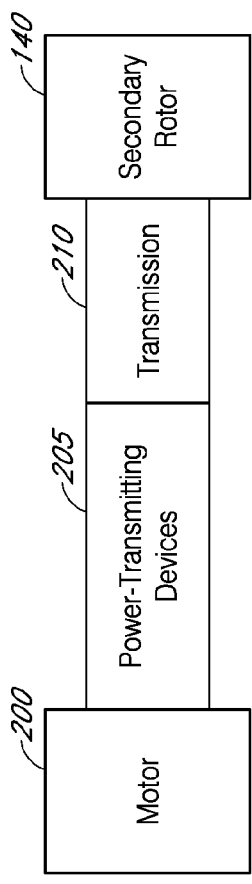
FIG. 7a is a block diagram illustrating aspects of the inventive bale processor according to some embodiments.
Figure 7B:
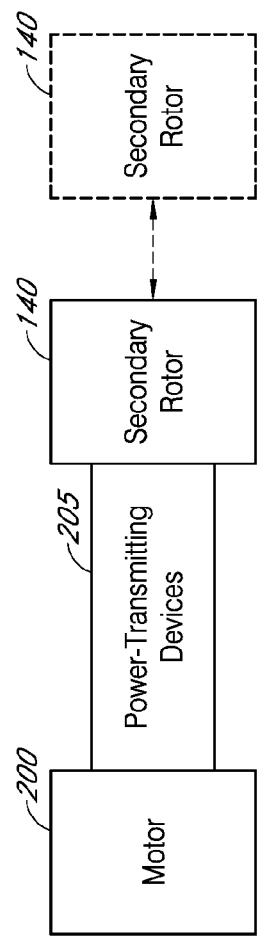
FIG. 7b is a block diagram illustrating aspects of the inventive bale processor according to other embodiments.

To allow the bale processor 100 to selectively utilize the secondary rotor 140, the secondary rotor 140 may be selectively engaged/disengaged from the power-transmitting device (e.g., through a transmission 210 as shown in FIG. 7a, or movement of the secondary rotor 140 as shown in FIG. 7b—with the re-positioned, disengaged secondary rotor 140 shown in dashed lines) and an internal deflector 150 may selectively remove/provide a partition between the primary and secondary rotors 130, 140. As discussed further below, movement of the internal deflector 150 may be synchronized with engagement/disengagement of the secondary rotor 140.

Figure 4:
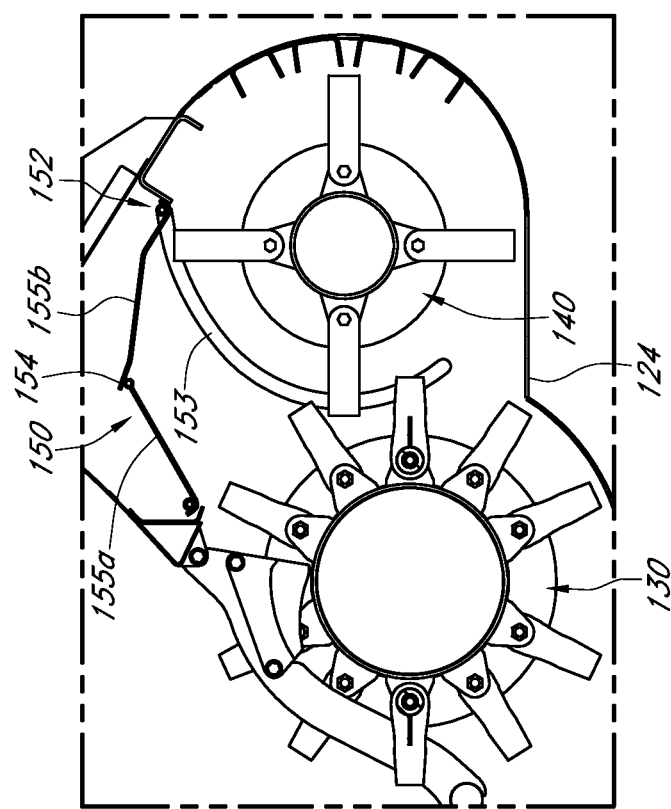
FIG. 4 shows structure for moving an internal deflector, according to an embodiment of the current invention.

The internal deflector 150 may have numerous configurations and methods of moving between disengaged (FIG. 2) and engaged (FIG. 3) positions. For example, the deflector 150 may have an end 152 that travels along a track 153 (FIG. 4), and a pivot 154 may allow sections 155a, 155b to move relative to one another. Particularly in embodiments with intermeshing rotors 130, 140, it may be desirable for the primary and secondary rotors 130, 140 to respectively have flails 132, 142 that fall freely when not in use. FIG. 3 shows the secondary rotor 140 disengaged and the flails 142 falling freely. But even in these embodiments, however, stationary knife sections may form part of the primary rotor 130 or the secondary rotor 140 to create an additional slicing action. For example, stationary knife sections may extend from a twelve o'clock position to a six o'clock position along the secondary rotor 140.

To ensure that the secondary rotor 140 remains disengaged when the internal deflector 150 is in the engaged (or "blocking") position, the mechanism for disengaging the secondary rotor 140 may be mechanically or electrically (e.g., through sensors and computer programming) linked to the mechanism for moving the internal deflector 150. In one embodiment, a gearbox and driveline mechanism is used to engage/disengage the secondary rotor 140 and move the internal deflector 150.

In use, after the primary rotor 130 chops bale filamentary material from a bale in the hopper 110 as described above, the chopped bale filamentary material passes from the primary rotor 130 to the secondary rotor 140 (FIG. 2). By traveling in the same direction as the primary rotor 130 (e.g., clockwise in FIG. 2), the secondary rotor 140 further chops the bale filamentary material and causes the bale filamentary material to change direction (e.g., from traveling downwardly about the axis 131 to traveling upwardly and clockwise about the axis 141). The bale filamentary material then rotates back to the primary rotor 130, where it is chopped still further and resumes its travel about the axis 131 to be discharged through the discharge opening 160. The described arrangement of the processing section 120 causes the bale filamentary material to be chopped three distinct times (twice by the primary rotor 130 and once by the secondary rotor 140) and may provide substantial reductions in bale filamentary material length in relatively short order.

Cut lengths of approximately three inches and under may be desirable in various applications. For example, forage must generally be no longer than three inches to be used in a Total Mixed Ration (TMR) mixer wagon. Similarly, some methods of biomass processing of bale filamentary material may benefit from relatively small cut lengths. Yet such a fine cut is not always necessary or desirable. When a fine cut is not needed, the secondary rotor 140 may be disengaged and the internal deflector 150 may be moved to the blocking position (FIG. 3) as discussed above. In this arrangement, after the primary rotor 130 chops bale filamentary material from a bale in the hopper 110 as described above, the chopped bale filamentary material rotates with the primary rotor 130 about the axis 131 and is discharged through the discharge opening 160 without being impeded by the secondary rotor 140.

An operator may perform maintenance on the primary rotor 130 through the discharge opening 160, and the secondary rotor 140 may be accessed (e.g., from a standing position) by removing an external portion of the processing section 120.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A bale processor, comprising:
   a hopper for receiving a bale of baled material;
   a discharge opening for outputting chopped material; and
   a processing section having primary and secondary rotors;
      the primary rotor having an axis of rotation and being rotatable to chop the material from the bale received in the hopper; the secondary rotor being rotatable to chop the material after being chopped by the primary rotor; the secondary rotor being offset from the primary rotor such that the primary rotor is between the secondary rotor and the discharge opening.

2. The bale processor of claim 1, wherein the primary rotor is rotatable in a direction selected to cause the material chopped by the primary rotor to temporarily travel away from the discharge opening.

3. The bale processor of claim 2, further comprising a power-transmitting device and a disengagement mechanism in communication with the secondary rotor for altering the secondary rotor between an engaged configuration in which the secondary rotor is engaged with the power-transmitting device and a disengaged configuration in which the secondary rotor is disengaged from the power-transmitting device.

4. The bale processor of claim 3, wherein:
   when the secondary rotor is in the engaged configuration, the primary rotor and the secondary rotor are rotatable in the same direction as one another such that the secondary rotor rotates material away from and subsequently back toward the primary rotor, rotation of the primary rotor and the secondary rotor resulting in three distinct chopping phases:
      first, chopping by the primary rotor;
      second, chopping by the secondary rotor; and
      third, additional chopping by the primary rotor.

5. The bale processor of claim 4, further comprising an internal deflector movable to:
   (a) allow passage between the primary rotor and the secondary rotor when the secondary rotor is in the engaged configuration; and
   (b) shield the secondary rotor from the primary rotor when the secondary rotor is in the disengaged configuration, such that chopped material passes from the primary rotor to the discharge opening without encountering the secondary rotor.

6. The bale processor of claim 4, further comprising:
   a conveyor in the hopper to rotate the baled material;
   means for rotating the primary rotor, the secondary rotor, and the conveyor; and
   an internal deflector movable between:
      one position allowing passage between the primary rotor and the secondary rotor; and
      another position shielding the secondary rotor from the primary rotor such that chopped material passes from the primary rotor to the discharge opening without encountering the secondary rotor;
   wherein the secondary rotor has an axis of rotation higher than the primary rotor axis of rotation.

7. The bale processor of claim 1, further comprising a conveyor in the hopper to rotate the baled material.

8. The bale processor of claim 7, further comprising means for rotating the primary rotor, the secondary rotor, and the conveyor.

9. The bale processor of claim 1, wherein the primary rotor and the secondary rotor intermesh when the primary and secondary rotors rotate.

10. The bale processor of claim 1, wherein the primary rotor is a flail rotor, and wherein the secondary rotor is a flail rotor.

11. The bale processor of claim 1, wherein the secondary rotor has an axis of rotation higher than the primary rotor axis of rotation.

12. The bale processor of claim 1, further comprising an internal deflector movable between:

one position allowing passage between the primary rotor and the secondary rotor; and another position shielding the secondary rotor from the primary rotor such that chopped material passes from the primary rotor to the discharge opening without encountering the secondary rotor.

13. The bale processor of claim 1, wherein the primary rotor has an operating speed of about 1500 RPM and the secondary rotor has an operating speed that is at least eighty-five percent faster than the operating speed of the primary rotor.

14. A bale processor, comprising:
a hopper for receiving a bale of baled material;
a discharge opening for outputting chopped material; and
a processing section below the hopper and intersecting the hopper at an impingement zone; the processing section having primary and secondary rotors; the primary rotor being rotatable and having flails sufficiently long to extend into the impingement zone to chop the baled material from the bale received in the hopper when the primary rotor is rotated; the secondary rotor being rotatable and having flails to chop the material after being chopped by the primary rotor;
wherein the secondary rotor is offset from the primary rotor such that the secondary rotor is on one side of the primary rotor, the discharge opening is on another side of the primary rotor, and the only passage from the secondary rotor to the discharge opening crosses the primary rotor.

15. The bale processor of claim 14, wherein the primary rotor is rotatable in a direction selected to cause the material chopped by the primary rotor to temporarily travel away from the discharge opening.

16. The bale processor of claim 14, further comprising a power-transmitting device and a disengagement mechanism in communication with the secondary rotor for altering the secondary rotor between an engaged configuration in which the secondary rotor is engaged with the power-transmitting device and a disengaged configuration in which the secondary rotor is disengaged from the power-transmitting device.

17. The bale processor of claim 16, wherein:
when the secondary rotor is in the engaged configuration, the primary rotor and the secondary rotor are rotatable in the same direction as one another such that the secondary rotor rotates material away from and subsequently back toward the primary rotor, rotation of the primary rotor and the secondary rotor resulting in three distinct chopping phases:
first, chopping by the primary rotor;
second, chopping by the secondary rotor; and
third, additional chopping by the primary rotor.

18. The bale processor of claim 14, further comprising an internal deflector movable between:
one position allowing passage between the primary rotor and the secondary rotor; and another position shielding the secondary rotor from the primary rotor such that chopped material passes from the primary rotor to the discharge opening without encountering the secondary rotor.

19. The bale processor of claim 14, further comprising a conveyor in the hopper to rotate the baled material.

20. A method of processing baled material, comprising the steps:
(a) providing a bale processor comprising:
a hopper for receiving a bale of baled material;
a discharge opening for outputting chopped material;
primary and secondary rotors; the primary rotor being rotatable and having an axis of rotation; the secondary rotor being rotatable and having an axis of rotation; the secondary rotor being offset from the primary rotor such that the primary rotor is between the secondary rotor and the discharge opening;
a power-transmitting device;
a disengagement mechanism in communication with the secondary rotor for altering the secondary rotor between an engaged configuration in which the secondary rotor is engaged with the power-transmitting device and a disengaged configuration in which the secondary rotor is disengaged from the power-transmitting device; and
a movable internal deflector;
(b) using the disengagement mechanism to alter the secondary rotor between the engaged and disengaged configurations;
(c) moving the internal deflector to allow passage between the primary rotor and the secondary rotor when the secondary rotor is in the engaged configuration, and to shield the secondary rotor from the primary rotor when the secondary rotor is in the disengaged configuration;
(d) providing baled material in the hopper;
(e) rotating the primary rotor in a first direction to chop the baled material from the bale received in the hopper, the material chopped by the primary rotor temporarily traveling away from the discharge opening;
(f) when the secondary rotor is in the engaged configuration, rotating the secondary rotor in the same direction as the primary rotor such that the secondary rotor rotates material away from and subsequently back toward the primary rotor, rotation of the primary rotor and the secondary rotor resulting in three distinct chopping phases:
first, chopping by the primary rotor;
second, chopping by the secondary rotor; and
third, additional chopping by the primary rotor; and
(g) when the secondary rotor is in the disengaged configuration, passing the material chopped by the primary rotor to the discharge opening without encountering the secondary rotor.

\* \* \* \* \*